(12) United States Patent
Ruf et al.

(10) Patent No.: US 8,608,148 B2
(45) Date of Patent: Dec. 17, 2013

(54) TOOL HOLDER, TOOL, AND WORKSTATION WITH TOOL HOLDER AND TOOL ATTACHED THERETO

(75) Inventors: Reinhold Ruf, Laupheim (DE);
Wolfgang Rodi, Laupheim/Baustetten (DE); Hans-Martin Poehler, Laichingen (DE); Uwe Hiller, Burgrieden (DE)

(73) Assignee: Uhlmann Pac-Systeme GmbH & Co. KG, Laupheim (DE)

( * ) Notice: Subject to any disclaimer, the term of this patent is extended or adjusted under 35 U.S.C. 154(b) by 525 days.

(21) Appl. No.: 12/871,446

(22) Filed: Aug. 30, 2010

(65) Prior Publication Data

US 2011/0056628 A1 Mar. 10, 2011

(30) Foreign Application Priority Data

Sep. 4, 2009 (EP) ..................................... 09169508

(51) Int. Cl.
*B29C 65/78* (2006.01)
(52) U.S. Cl.
USPC ............ 269/315; 269/289 R; 269/10; 269/47; 269/291; 269/303
(58) Field of Classification Search
USPC ........... 269/10, 47, 48, 91, 95, 290, 291, 303, 269/315, 318, 87, 37, 43; 403/362
See application file for complete search history.

(56) References Cited

U.S. PATENT DOCUMENTS

| | | | | | |
|---|---|---|---|---|---|
| 1,393,083 | A | * | 10/1921 | Campbell | ........................ 269/97 |
| 5,728,106 | A | * | 3/1998 | Misko et al. | ................... 606/130 |
| 7,464,737 | B2 | * | 12/2008 | Duginske | ................... 144/253.1 |
| D677,147 | S | * | 3/2013 | Vandenberg | .................... D8/387 |
| 2003/0219307 | A1 | * | 11/2003 | Schmalzhofer | ............... 403/362 |
| 2009/0001642 | A1 | * | 1/2009 | Bolton | ............................ 269/37 |

FOREIGN PATENT DOCUMENTS

DE    102006004093 B3    3/2007

OTHER PUBLICATIONS

European Search Report for EP09169508—Jun. 9, 2010.

* cited by examiner

*Primary Examiner* — Joseph J Hail
*Assistant Examiner* — Henry Hong
(74) *Attorney, Agent, or Firm* — Brinks Gilson & Lione

(57) ABSTRACT

A tool holder (2) defines three stop surfaces (18, 20, 22), which lie in three planes (60, 62, 64), which are perpendicular to each other. A pin (24), which can be lowered into the base body (8) of the tool holder (2) and extended from it, is to be introduced into a receptacle (42) of the tool (4) and comprises a slanted active contact surface (26), which defines a fourth plane (66), which intersects each of the three planes (60, 62, 64) of the tool holder (2) at an acute angle, as a result of which the active pressure surface (26), upon the extension of the pin (24), exerts a force component toward each of the three stop surfaces (18, 20, 22). A corresponding tool (4) and a workstation with the tool holder (2) and the tool (4) attached thereto are also described.

16 Claims, 8 Drawing Sheets

TOOL HOLDER, TOOL, AND WORKSTATION WITH TOOL HOLDER AND TOOL ATTACHED THERETO

CROSS-REFERENCE TO RELATED APPLICATIONS

The present patent document claims the benefit of priority to European Patent Application No. EP 09169508.0, filed Sep. 4, 2009, and entitled "TOOL HOLDER, TOOL, AND WORKSTATION WITH TOOL HOLDER AND TOOL ATTACHED THERETO," the entire contents of each of which are incorporated herein by reference.

FIELD AND BACKGROUND OF THE INVENTION

The present invention relates to a tool holder, to a tool, and to a workstation with the tool holder and a tool attached thereto.

In many areas of industry, it is absolutely essential for a tool to be fastened to a tool holder in a precise and secure manner. Workstations consisting of a tool holder carrying an attached tool must often be positioned with an accuracy of fractions of a millimeter so that the work in question can be carried out with sufficient accuracy.

In the area of the pharmaceutical industry, it is necessary to arrange a large number of workstations in a row for the production of blister packs, for example. Because the tools must often be adapted to different blister pack formats, it is necessary to replace the tools to meet the associated specifications.

For this purpose, there are many different possible ways in which a tool can be attached to a tool holder so that the tool can be replaced and so that, at the same time, the effort required to adjust it is minimized.

An example of an attachment mechanism is shown in DE 10 2006 004 093 B3. Here a cone, on which a clamping pin acts, is formed in the surface of the tool. The clamping pin comprises a contact surface corresponding to the cone. This ensures a secure connection between the tool holder and the tool, whereas the tool can be replaced relatively easily. Nevertheless, certain tolerance problems are not completely overcome here, either.

BRIEF SUMMARY OF THE INVENTION

It is an object of the present invention to provide a tool holder and a tool to be attached thereto, which make it possible for the tool to be replaced easily and which at the same time allow the tool to position itself automatically and very precisely in the tool holder.

According to an aspect of the invention, the tool holder comprises a base body and a stop element projecting upward from the base body. The stop element defines a first stop surface for the tool, wherein the first stop surface lies in a first plane of the tool holder. In addition, the tool holder comprises two guide elements, projecting upward from the base body, to cooperate with guide sections of the tool, wherein each guide element comprises two side pieces, a first side piece of each element extending vertically upward from the base body, and a second side piece branching off at a right angle from the corresponding first side piece, so that the second side pieces of the two guide elements face each other. One of the first side pieces defines a second stop surface for the tool; this second stop surface lies in a second plane of the tool holder, which is perpendicular to the first plane of the tool holder. In addition, the second side piece associated with the one of the first side pieces defines a third stop surface for the tool; this third stop surface lies in a third plane of the tool holder, which is perpendicular to the first plane and to the second plane of the tool holder. The tool holder also comprises a pin, which can be lowered into the base body and extended from it, and which is to be introduced into a receptacle in the tool, wherein the pin comprises a slanted active contact surface, which defines a fourth plane, which intersects each of the three planes of the tool holder at an acute angle, as a result of which, when the pin is extended, its active contact surface delivers a force component acting in the direction toward each of the three stop surfaces.

The corresponding tool to be mounted in the tool holder comprises a base body with a first shoulder surface, which lies in a first plane of the tool, and also two guide sections, projecting laterally in opposite directions from a lower edge area of the base body; these two guide sections are designed to be received by the guide elements of the tool holder. One of the guide sections comprises a second shoulder surface, which lies in a second plane of the tool; this second shoulder surface is perpendicular to the first plane. In addition, the one of the guide section comprises a third shoulder surface, which lies in a third plane of the tool; this third shoulder surface is perpendicular to the first plane and to the second plane of the tool. The tool also comprises a receptacle in the base body for a pin of the tool holder, wherein the receptacle comprises a slanted passive contact surface, which defines a fourth plane, which intersects each of the three planes of the tool at an acute angle.

With this design, the position of the tool on the tool holder can be defined with high precision.

Force is transmitted toward each of the three stop surfaces of the tool holder in an especially efficient manner if the fourth plane of the tool holder intersects the first plane of the tool holder at an angle in the range of between 30° and 60°, if the fourth plane of the tool holder intersects the second plane of the tool holder at an angle in the range of between 30° and 60°, and if the fourth plane of the tool holder intersects the third plane of the tool holder at an angle in the range of between 30° and 60°. Correspondingly, it is advantageous if the fourth plane of the tool intersects the first plane of the tool at an angle in the range of between 30° and 60°, if the fourth plane of the tool intersects the second plane of the tool at an angle in the range of between 30° and 60°, and if the fourth plane of the tool intersects the third plane of the tool at an angle in the range of between 30° and 60°.

The force exerted on the passive contact surface of the tool by the active contact surface of the tool holder in the direction toward the three stop surfaces is distributed in an especially uniform manner if each of the angles of intersection is in the range of between 40° and 50°, even more preferably if each angle is exactly 45°. In this case, the force components acting in the direction toward the three stop surfaces are symmetric.

The tool holder may also comprise a pin extension mechanism which preferably comprises a threaded spindle. In this way, the pin can be moved in a highly precise and defined manner.

So that the pin can be extended simply and by purely mechanical means, the threaded spindle is preferably arranged parallel to the third plane of the tool holder and comprises a conical tip at its forward end, which acts on a slanted working surface of the pin.

A workstation which comprises a tool holder according to the invention with a tool according to the invention attached thereto is also subject of the present invention.

In the assembled state of the workstation, the first, second, third, and fourth planes of the tool holder coincide with the first, second, third, and fourth planes of the tool.

In the area of the pharmaceutical industry, it is especially important during the production of blister packs for the sheet to be guided precisely with respect to the tool. Because different stops are used, a variety of tolerance problems occur here as well, which require manual adjustment.

In a preferred embodiment of the workstation, the sheet guide therefore comprises a shoulder, which is pushed against a stop on a guide column of the tool. As a result of this measure in combination with the highly precise support of the tool in the tool holder, the cumulative tolerances are so small that there is no need for any readjustments.

BRIEF DESCRIPTION OF THE DRAWINGS

Additional features and advantages of the present invention can be derived from the following description, based on the drawings.

DETAILED DESCRIPTION OF SPECIFIC EMBODIMENTS

Figure 1:
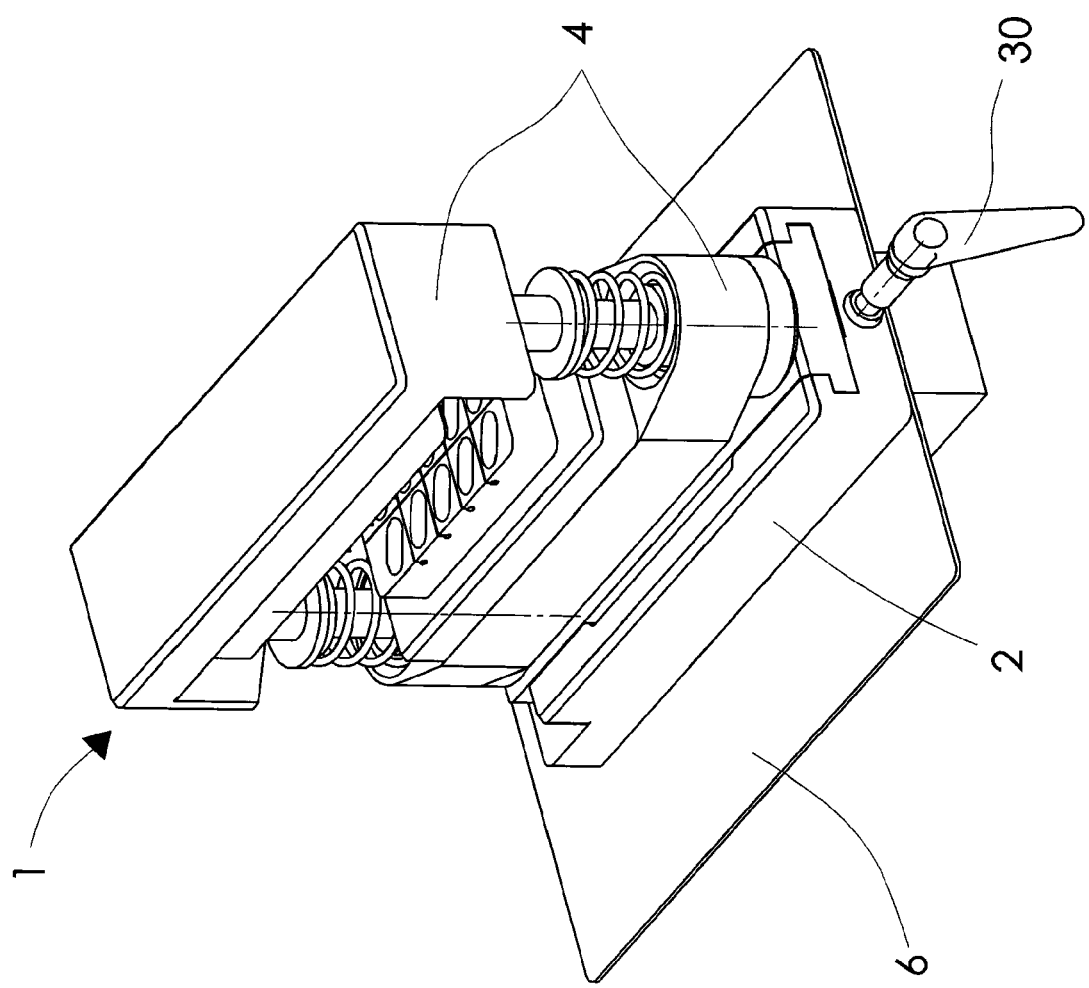
FIG. 1 is a perspective view of a workstation with a tool holder carrying an attached tool.

FIG. 1 shows a workstation of the type which finds application in the pharmaceutical industry. The workstation 1 comprises a tool holder 2 and tool 4, which is attached to the tool holder 2. The tool holder 2 is supported in a fixed station frame 6.

Figure 2:
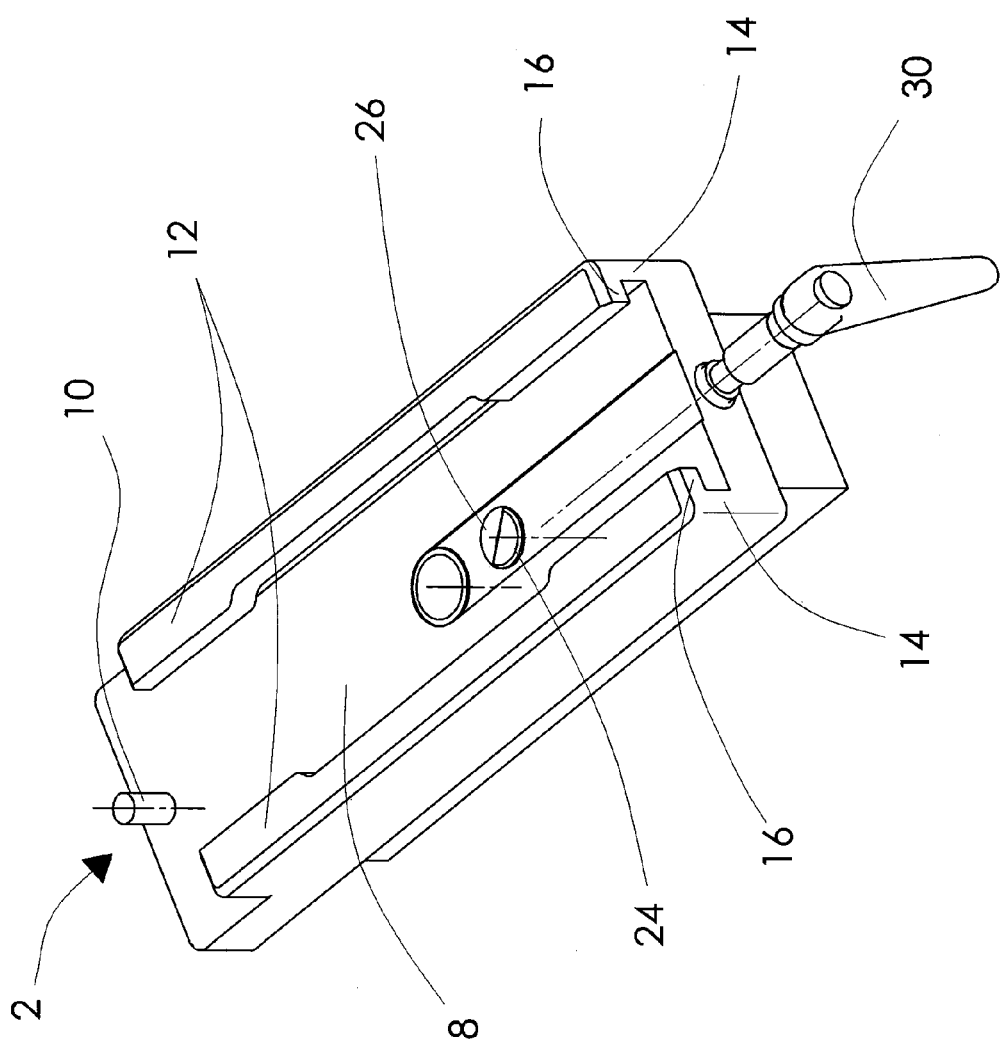
FIG. 2 is a perspective view of the tool holder according to FIG. 1.

FIG. 2 shows the tool holder 2 in detail. The tool holder 2 comprises a base body 8, a stop element 10 projecting upward from the base body 8, and two guide elements 12 projecting upward from the base body 8. The stop element 10 in the present example is designed as a pin, but it could also be designed as an elongated shoulder or in any other similar way desired. Each of the two guide elements 12 comprises a first side piece 14, which extends vertically upward from the base body 8 (see also FIG. 3), and a second side piece 16, which branches off from the first side piece 14 at a right angle in such a way that the second side pieces 16 of the two guide elements 12 face each other.

Figure 3:
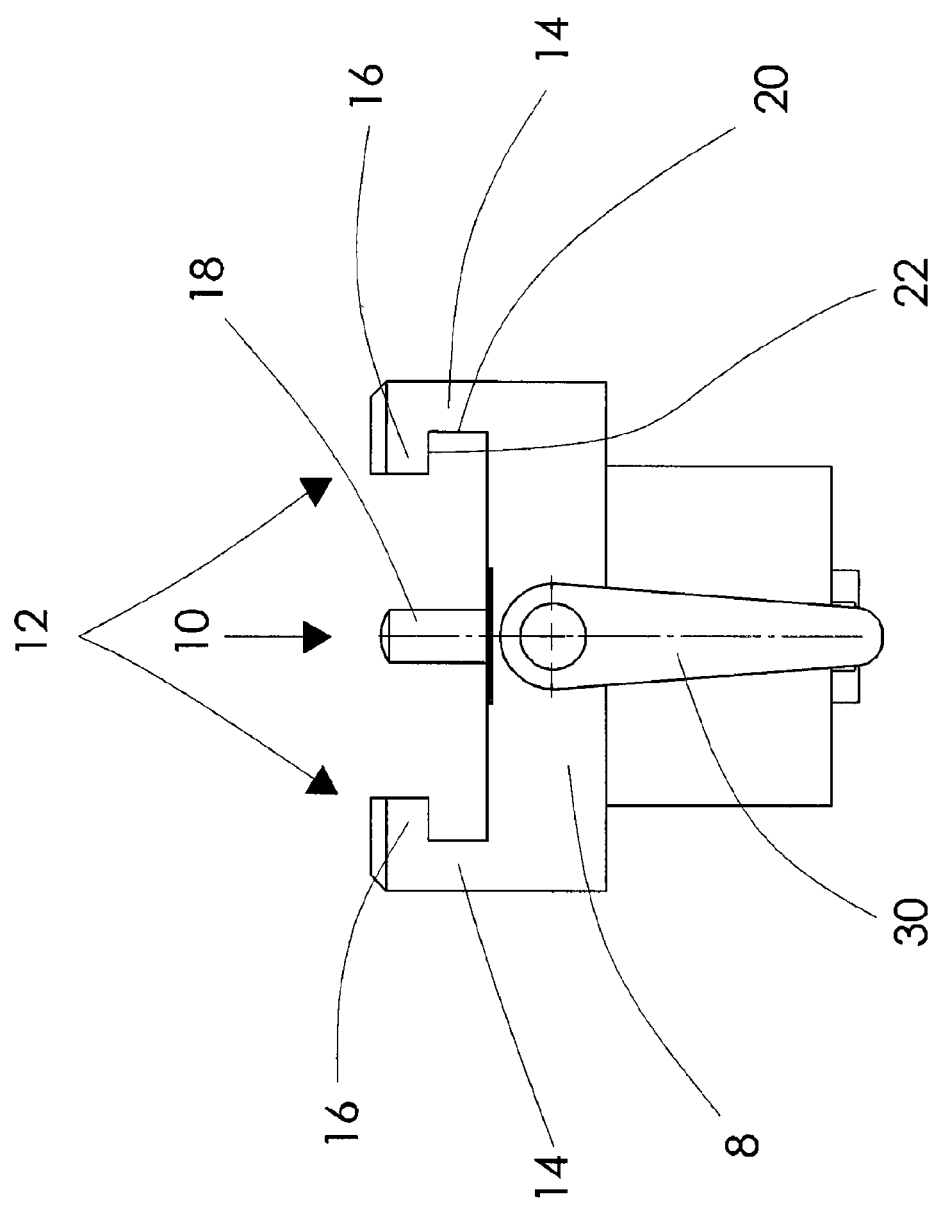
FIG. 3 is a side view of the tool holder according to FIG. 2.

As can be seen best in FIG. 3, the stop element 10 defines a first stop surface 18 for the tool 4, which is described further below with reference to FIGS. 4 and 5. In the example shown here, the first side piece 14 of the guide element 12 shown on the right in the figure defines a second stop surface 20 for the tool 4, and the associated second side piece 16 defines a third stop surface 22 for the tool 4.

The tool holder 2 also comprises a pin 24, which is recessed into the base body 8 and can be extended from it. The pin 24 comprises a slanted active contact surface 26. The pin 24 is extended by means of an extension mechanism 28, which is described in greater detail below with reference to FIG. 6. The extension mechanism is actuated by way of an actuating element 30, here in the form of a clamping lever.

Figure 4:
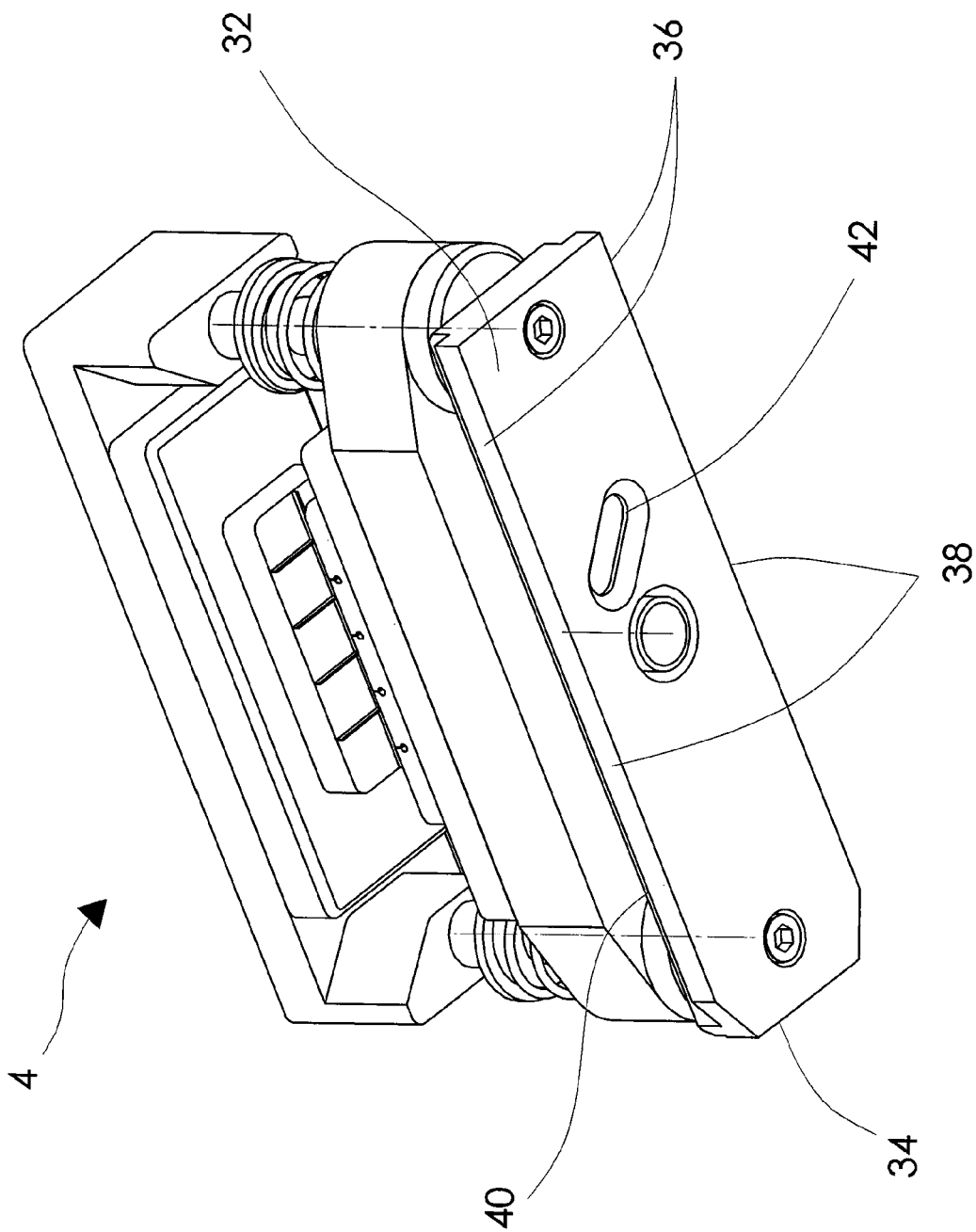
FIG. 4 is a perspective view of the tool according to FIG. 1.
Figure 5:
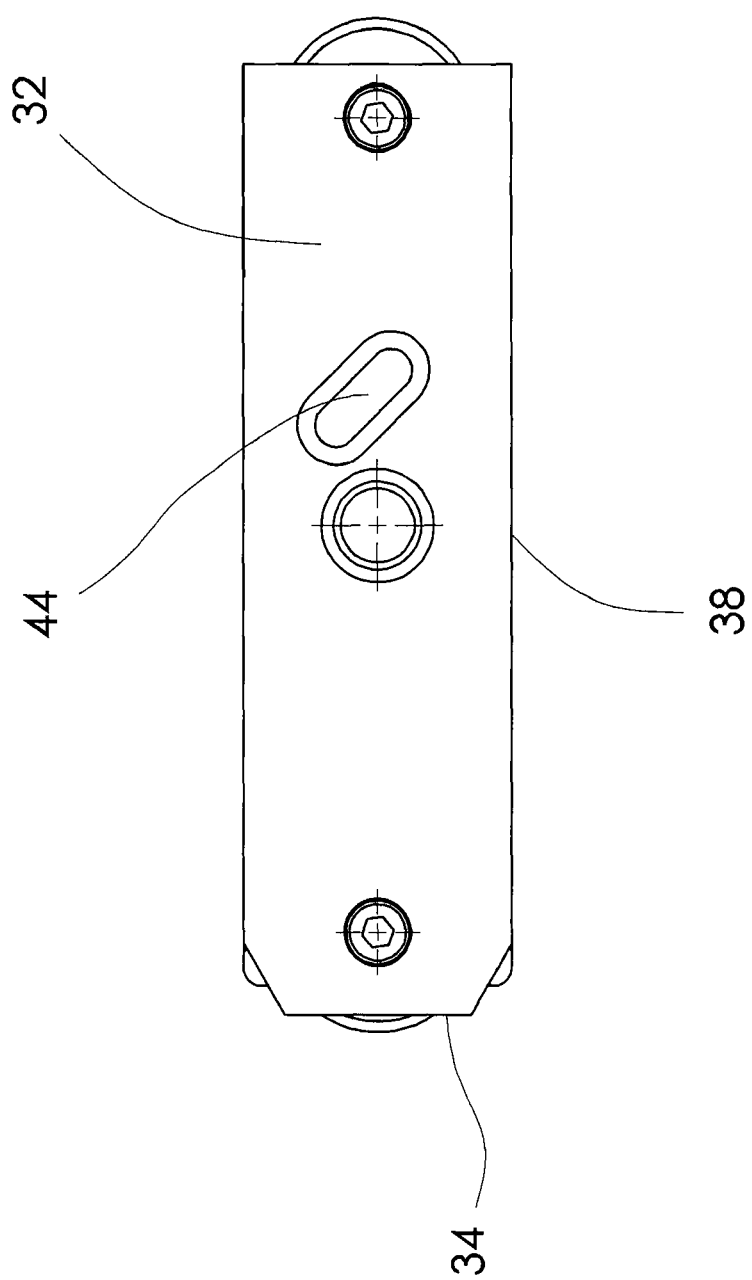
FIG. 5 is a view from below of the tool according to FIG. 4.

The associated tool 4 is shown in detail in FIGS. 4 and 5. The tool 4 comprises a base body 32, which defines a first shoulder surface 34, which serves as a stop for the first stop surface 18 of the tool holder 2. In a lower edge area of the base body 32, two guide sections 36 project laterally in opposite directions. The two guide sections 36 are designed to be received in the guide elements 12 of the tool holder 2. One of the two guide sections 36, namely, the guide section 36 located in the rear in the example illustrated in FIG. 4, defines a second shoulder surface 38, which is designed to be contacted by the second stop surface 20 of the tool holder 2. Finally, this same guide section 36 defines in its upper area a third shoulder surface 40, which is perpendicular to the second shoulder surface 38 and which is designed to be contacted by the third stop surface 22 of the tool holder 2, as can be seen best in FIG. 1.

In the base body 32 of the tool 4, furthermore, a receptacle 42 is provided for the pin 24 of the tool holder 2. This receptacle 42 comprises a passive contact surface 44, which cooperates with the slanted active contact surface 26 of the pin 24. This can be seen very clearly in FIG. 6.

Figure 6:
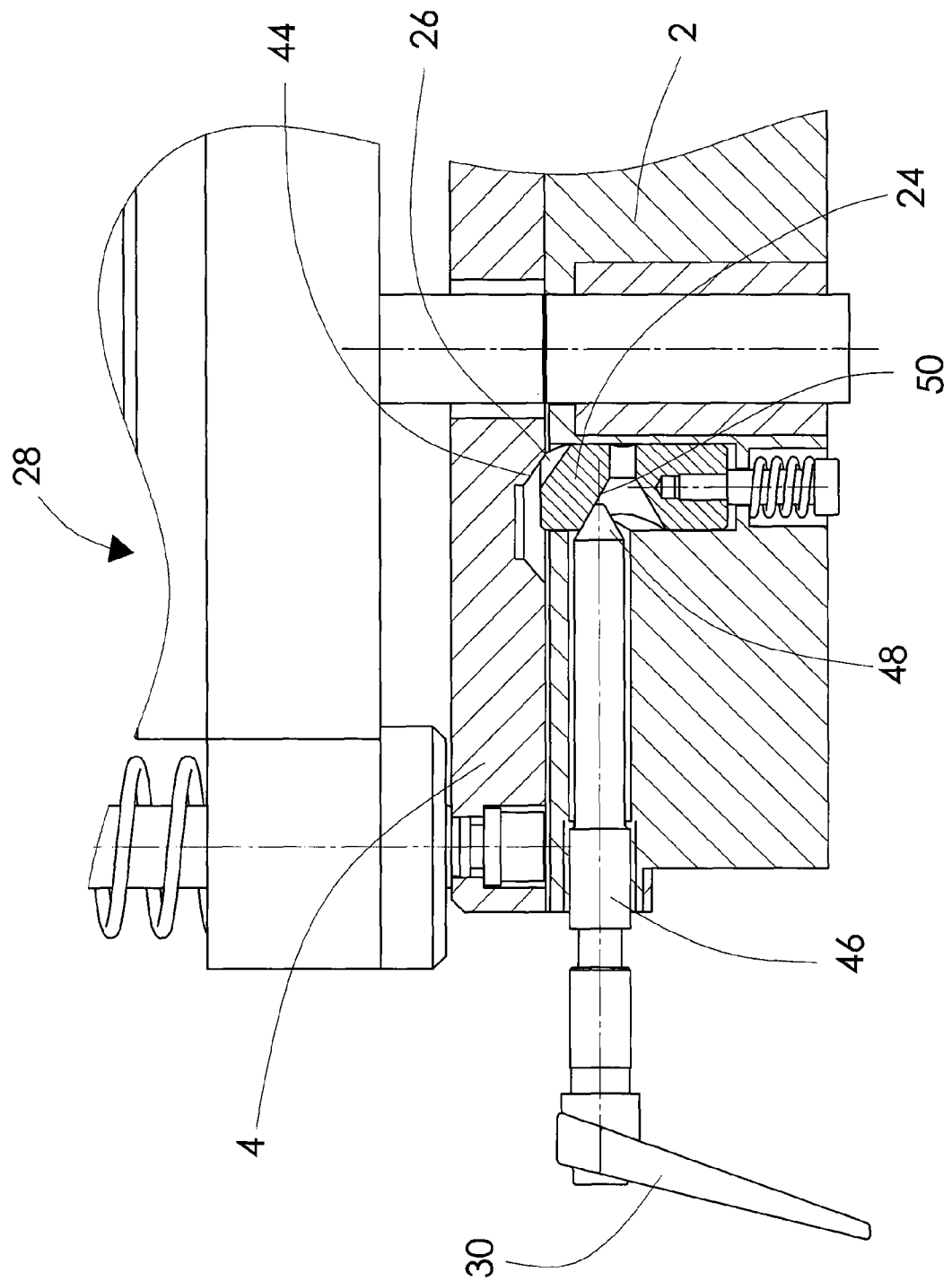
FIG. 6 is a cross-sectional view of the workstation according to FIG. 1.

FIG. 6 is a cross-sectional view of the extension mechanism 28 for the pin 24. It comprises a threaded spindle 46, which can be actuated by the actuating element 30 and comprises at its forward end a conical tip 48. The conical tip 48 acts on a slanted working surface 50 of the pin 24. In the present example, the working surface 50 is created by a recess in the pin 24. By actuation of the actuating element 30, the threaded spindle 46 is driven forward, so that the conical tip 48 acts on the slanted working surface 50 of the pin 24 and pushes the pin upward. Thus the active contact surface 26 on the pin 24 acts on the passive contact surface 44 in the receptacle 42 in the tool 4 and presses the tool 4 with a force component in the direction toward the first stop surface 18, with a force component in the direction toward the second stop surface 20, and with a force component in the direction toward the third stop surface 22.

It is preferable to provide means for arresting the actuating element 30. In addition, the pin 24 can be actuated by a spring element (not shown), which pushes it upward. In addition to the embodiment illustrated here, many other possible ways of moving the pin 24 up and back down again in a controlled manner can be imagined within the scope of the invention. For example, the pin 24 could also be moved directly by a drive.

Figure 7:
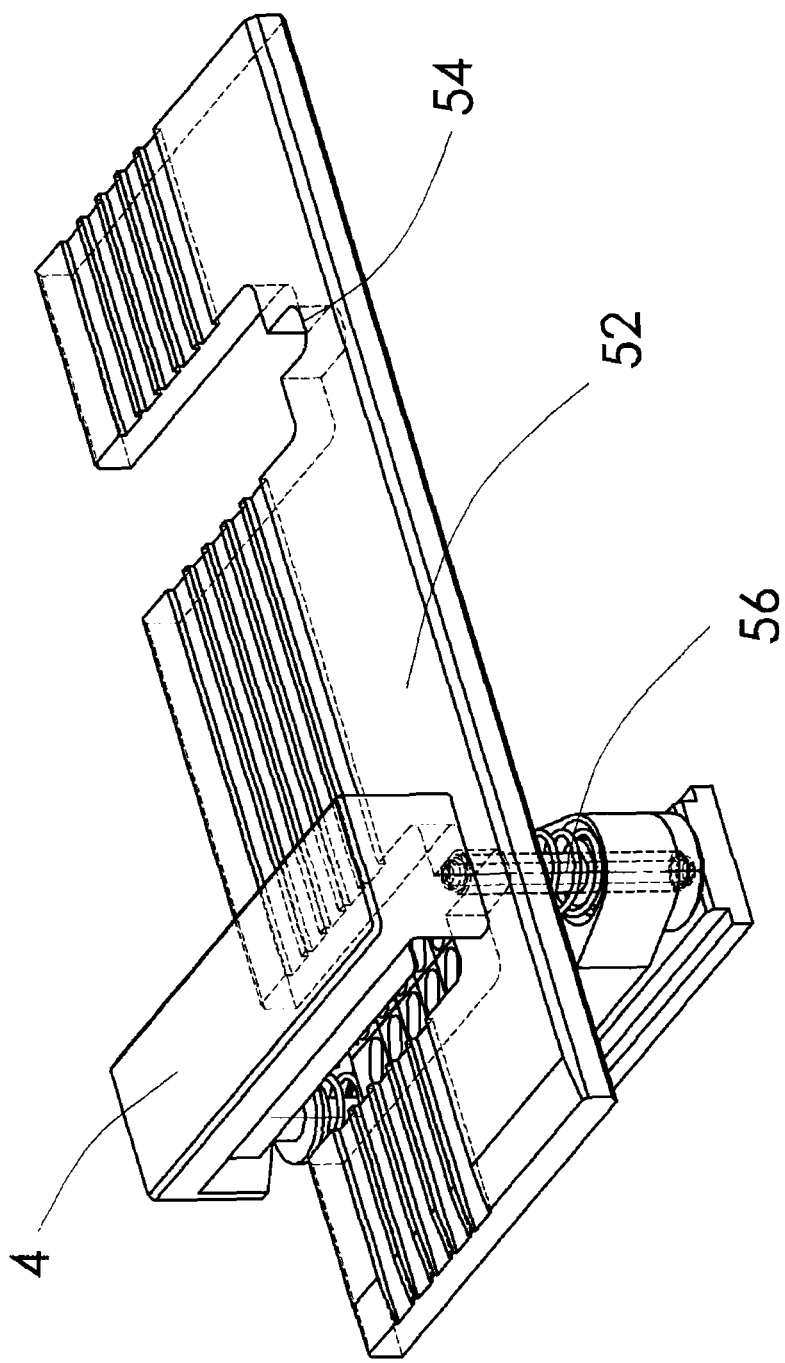
FIG. 7 is a perspective view of a workstation with a sheet guide.

FIG. 7 shows a workstation 1 with a tool 4 attachable to a tool holder 2 (not shown) and with a sheet guide 52. The sheet guide 52 comprises a shoulder 54, which is pushed against a corresponding stop of a guide column 56 of the tool 4 and then fixed in position. Thus the positional relationships between the tool holder 2, the tool 4, and the sheet guide 52 within the workstation 1 are established with high precision.

Figure 8:
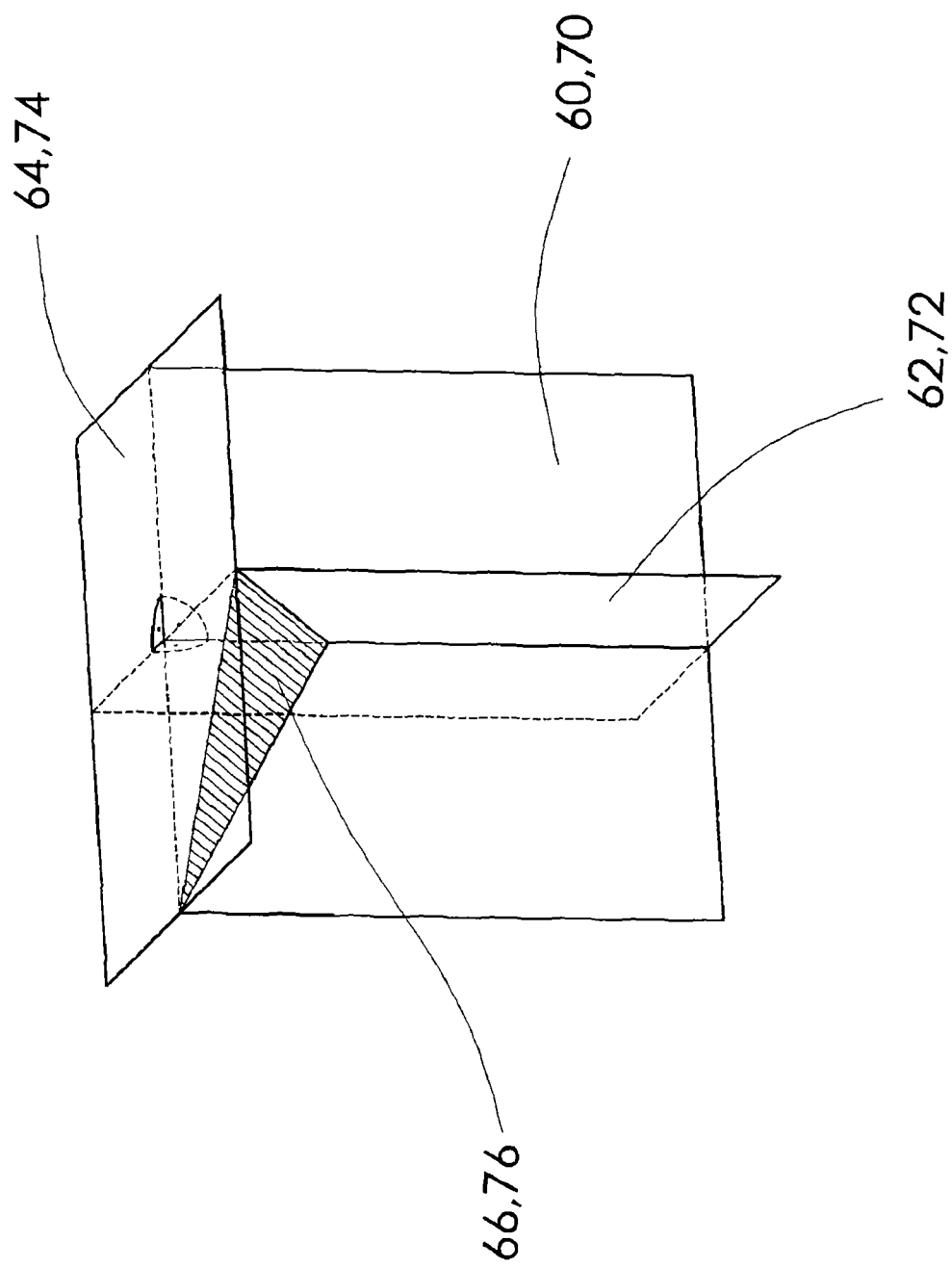
FIG. 8 is a schematic diagram of four different planes of the tool holder and of the tool and their relative arrangement with respect to each other.

In the form of a schematic diagram, FIG. 8 illustrates the positional relationships of the stop surfaces 18, 20, and 22 and of the active contact surface 26 in the tool holder 2 relative to each other. FIG. 8 can also be interpreted as a schematic diagram of the positional relationships between the first shoulder surface 34, the second shoulder surface 38, the third shoulder surface 40, and the passive contact surface 44 in the tool 4.

First, the drawing will be explained on the basis of the example of the relationships in the tool holder 2. The first stop surface 18 lies in a first plane 60 of the tool holder 2. The second stop surface 20 lies in a second plane 62 of the tool holder 2, which is perpendicular to the first plane 60 of the tool holder 2. The third stop surface 22 lies in a third plane 64 of the tool holder 2, which is perpendicular to the first plane 60 and to the second plane 62 of the tool holder 2. The slanted active contact surface 26 on the pin 24 defines a fourth plane 66 of the tool holder 2, which intersects the first plane 60, the second plane 62, and the third plane 64 of the tool holder 2 at an acute angle in each case. This ensures that the active contact surface 26, upon the extension of the pin 24, delivers a force component directed at each of the three stop surfaces 18, 20, 22.

The angle relationships of the fourth plane 66 to the other three planes 60, 62, 64 can be selected freely within certain limits, but it is preferable for each of the three angles of intersection (between the fourth plane 66 and the first plane 60, between the fourth plane 66 and the second plane 62, and between the fourth plane 66 and the third plane 64) to be in the range of between 30° and 60°. So that the force is exerted uniformly toward each of the stop surfaces 18, 20, 22, an angle in the range of between 40° and 50° is even more preferred. If all three angles are 45°, a completely uniform distribution of the force components in all three directions is achieved. This ideal design is not absolutely necessary in practice, however.

As previously mentioned, FIG. 8 can also be interpreted equally well as pertaining to the positional relationships in the tool 4. To this end, it must first be established that the first shoulder surface 34 lies in a first plane 70 of the tool 4, that the second shoulder surface 38 lies in a second plane 72 of the tool 4, that the third shoulder surface 40 lies in a third plane 74 of the tool 4, and that a fourth plane 76 of the tool 4 is defined by the slanted passive contact surface 44. In this interpretation, the first plane 60 of the tool holder 2 can be replaced by the first plane 70 of the tool 4, the second plane 62 of the tool holder 2 by the second plane 72 of the tool 4, the third plane 64 of the tool holder 2 by the third plane 74 of the tool 4, and the fourth plane 66 of the tool holder 2 by the fourth plane 76 of the tool 4.

Of course, in the assembled state of the workstation 1, the first planes 60, 70, the second planes 62, 72, the third planes 64, 74, and the fourth planes 66, 76 of the tool holder 2 and of the tool 4 as defined above coincide, because the stop surfaces 18, 20, 22 rest against the corresponding shoulder surfaces 34, 38, 40, and the active contact surface 26 rests on the passive contact surface 44.

The invention claimed is:

1. A tool holder comprising:
  a base body;
  a stop element projecting upward from the base body and defining a first stop surface for a tool, wherein the first stop surface lies in a first plane of the tool holder;
  two guide elements projecting upward from the base body to cooperate with guide sections of the tool, wherein each guide element comprises first and second side pieces, each first side piece extending vertically upward from the base body, each second side piece branching off from the corresponding first side piece at a right angle in such a way that the second side pieces of the two guide elements face each other, wherein the two guide elements enclose a space between them, the space being open to a top and confined by the base body at a bottom;
  wherein one of the first side pieces defines a second stop surface for the tool, which second stop surface lies in a second plane of the tool holder which is perpendicular to the first plane of the tool holder;
  wherein one of the second side pieces associated with the one of the first side pieces defines a third stop surface for the tool, which third stop surface lies in a third plane of the tool holder which is perpendicular to the first plane and to the second plane of the tool holder; and
  a pin, which is recessed into the base body and can be extended from the base body into the space between the guide elements, and which is to be introduced into a receptacle in the tool, wherein the pin comprises a planar slanted active contact surface, which defines a fourth plane, which intersects each of the first, second and third planes of the tool holder at an acute angle, as a result of which the active contact surface, upon extension of the pin, delivers a force component acting toward each of the first, second and third stop surfaces.

2. The tool holder according to claim 1, wherein the fourth plane intersects the first plane at an angle in the range of between 30° and 60°, wherein the fourth plane intersects the second plane at an angle in the range of between 30° and 60°, and wherein the fourth plane intersects the third plane at an angle in the range of between 30° and 60°.

3. The tool holder according to claim 2, wherein the fourth plane intersects the first plane at an angle in the range of between 40° and 50°, wherein the fourth plane intersects the second plane at an angle in the range of between 40° and 50°, and wherein the fourth plane intersects the third plane at an angle in the range of between 40° and 50°.

4. The tool holder according to claim 3, wherein the fourth plane intersects the first plane at an angle of 45°, wherein the fourth plane intersects the second plane at an angle of 45°, and wherein the fourth plane intersects the third plane at an angle of 45°.

5. The tool holder according to claim 1, further comprising an extension mechanism for the pin, which comprises a threaded spindle.

6. The tool holder according to claim 5, wherein the threaded spindle is arranged parallel to the third plane of the tool holder and comprises at a forward end a conical tip, which acts on a slanted working surface of the pin.

7. A tool to be received in a tool holder, comprising:
  a base body with a first shoulder surface, which lies in a first plane of the tool; two guide sections projecting laterally in opposite directions from the base body and designed to be received in guide elements of the tool holder, the guide sections being thinner in cross-section than the base body;
  wherein one of the guide sections comprises a second shoulder surface, which lies in a second plane of the tool which is perpendicular to the first plane; and
  wherein the one of the guide sections comprises a third shoulder surface, which lies in a third plane of the tool which is perpendicular to the first plane and to the second plane of the tool; and
  a receptacle arranged in the base body to receive a pin of the tool holder, the receptacle being open at a bottom and closed at a top, wherein the receptacle comprises a planar slanted passive contact surface at the closed top of the receptacle, which defines a fourth plane, which intersects each of the first, second and third planes of the tool at an acute angle.

8. The tool according to claim 7, wherein the fourth plane intersects the first plane at an angle in the range of between 30° and 60°, wherein the fourth plane intersects the second plane at an angle in the range of between 30° and 60°, and wherein the fourth plane intersects the third plane at an angle in the range of between 30° and 60°.

9. The tool according to claim 8, wherein the fourth plane intersects the first plane at an angle in the range of between 40° and 50°, wherein the fourth plane intersects the second plane at an angle in the range of between 40° and 50°, and wherein the fourth plane intersects the third plane at an angle in the range of between 40° and 50°.

10. The tool according to claim 9, wherein the fourth plane intersects the first plane at an angle of 45°, wherein the fourth plane intersects the second plane at an angle of 45°, and wherein the fourth plane intersects the third plane at an angle of 45°.

11. A workstation comprising a tool holder and a tool attached thereto,
  a) the tool holder comprising:
    a base body;
    a stop element projecting upward from the base body and defining a first stop surface for the tool, wherein the first stop surface lies in a first plane of the tool holder;
    two guide elements projecting upward from the base body to cooperate with guide sections of the tool, wherein each guide element comprises first and second side pieces, each first side piece extending vertically upward from the base body, each second side piece branching off from the corresponding first side piece at a right angle in such a way that the second side pieces of the two guide elements face each other;
    wherein one of the first side pieces defines a second stop surface for the tool, which second stop surface lies in a second plane of the tool holder which is perpendicular to the first plane of the tool holder;
    wherein one of the second side pieces associated with the one of the first side pieces defines a third stop surface for the tool, which third stop surface lies in a third plane of the tool holder which is perpendicular to the first plane and to the second plane of the tool holder; and
    a pin, which can be lowered into the base body and extended from the base body, and which is to be introduced into a receptacle in the tool, wherein the pin comprises a slanted active contact surface, which defines a fourth plane, which intersects each of the first, second and third planes of the tool holder at an acute angle, as a result of which the active contact surface, upon the extension of the pin, delivers a force component acting toward each of the first, second and third stop surfaces; and
  b) the tool comprising:
    a base body with a first shoulder surface, which lies in a first plane of the tool;
    two guide sections projecting laterally in opposite directions from the base body and designed to be received in the guide elements of the tool holder;
    wherein one of the guide sections comprises a second shoulder surface, which lies in a second plane of the tool which is perpendicular to the first plane; and
    wherein the one of the guide sections comprises a third shoulder surface, which lies in a third plane of the tool which is perpendicular to the first plane and to the second plane of the tool; and
    the receptacle arranged in the base body to receive the pin of the tool holder, wherein the receptacle comprises a slanted passive contact surface, which defines a fourth plane, which intersects each of the first, second and third planes of the tool at an acute angle.

12. The workstation according to claim 11, wherein the first, second, third, and fourth plane of the tool holder, in the assembled state of the workstation, coincide with the first, second, third, and fourth plane of the tool.

13. The workstation according to claim 11, further comprising a sheet guide, which comprises a shoulder, which is pushed against a stop of a guide column of the tool.

14. The tool holder according to claim 1, wherein a distal end of the pin located away from a user defines the slanted active contact surface.

15. The tool holder according to claim 1, wherein the slanted active contact surface is located within the space between the two guide elements.

16. the tool according to claim 7, wherein the tool is structured such that a force applied to the slanted passive contact surface is transmitted through the base body and guide sections towards the first, second and third planes.

* * * * *